United States Patent [19]

Yamazaki

[11] Patent Number: 5,040,067
[45] Date of Patent: Aug. 13, 1991

[54] METHOD AND DEVICE FOR PROCESSING MULTIPLE VIDEO SIGNALS

[75] Inventor: Seiichi Yamazaki, Saitama, Japan

[73] Assignee: Pioneer Electronic Corporation, Tokyo, Japan

[21] Appl. No.: 303,224

[22] Filed: Jan. 30, 1989

[30] Foreign Application Priority Data

Jul. 6, 1988 [JP] Japan .................. 63-168590

[51] Int. Cl.$^5$ .................................. H04N 5/45
[52] U.S. Cl. ........................ 358/183; 358/22
[58] Field of Search ............. 358/183, 22, 181

[56] References Cited

U.S. PATENT DOCUMENTS

| | | | |
|---|---|---|---|
| 4,139,860 | 2/1979 | Micic et al. | 358/183 X |
| 4,238,773 | 12/1980 | Tsuboka et al. | 358/183 |
| 4,259,690 | 3/1981 | Nakanishi et al. | 358/183 |
| 4,729,027 | 3/1988 | Hakamada et al. | 358/183 |
| 4,746,983 | 5/1988 | Hakamada | 358/183 |
| 4,774,582 | 9/1988 | Hakamada et al. | 358/183 |
| 4,777,531 | 10/1988 | Hakamada et al. | 358/183 |
| 4,796,089 | 1/1989 | Imai et al. | 358/22 X |
| 4,816,915 | 3/1989 | Imai et al. | 358/183 |
| 4,855,833 | 8/1989 | Kageyama et al. | 358/183 |
| 4,862,269 | 8/1989 | Sonada et al. | 358/183 X |
| 4,931,872 | 6/1990 | Stoddard et al. | 358/183 |

FOREIGN PATENT DOCUMENTS

| | | |
|---|---|---|
| 57-208772 | 12/1982 | Japan . |
| 62-154884 | 7/1987 | Japan . |
| 63-146671 | 6/1988 | Japan . |
| 63-179671 | 6/1988 | Japan . |
| 63-200681 | 8/1988 | Japan . |

Primary Examiner—James J. Groody
Assistant Examiner—Mark R. Powell
Attorney, Agent, or Firm—Finnegan, Henderson, Farabow, Garrett, and Dunner

[57] ABSTRACT

An apparatus and corresponding method for reducing and displaying N input video scenes within a larger, selected main video scene. A main picture signal is selected from the N input picture signals. The N input signals are then selected sequentially by a counter to be auxiliary picture signals that are stored in respective areas of a digital memory. By switching the output signal between the main picture scene signal and the auxiliary picture scene signals from memory, the auxiliary picture scenes may be displayed at predetermined locations within the main picture scene. Additionally, one of the N input video signals may be from video tape recorder having an input provided by any of the remaining N−1 input video signals. Proper recording by the video tape recorder may then be monitored as one of the N auxiliary picture scenes.

14 Claims, 5 Drawing Sheets

METHOD AND DEVICE FOR PROCESSING MULTIPLE VIDEO SIGNALS

FIELD OF THE INVENTION

The present invention relates to a video signal processing device, and specifically relates to a video signal processing device having a picture-in picture function.

DESCRIPTION OF THE RELATED ART

FIG. 8 shows a conventional video signal processing device having a picture-in-picture function for processing a plurality of video signals, in which a two-dimensionally reduced picture scene is displayed within a single picture scene. The two pictures respectively formed by the two video signals are simultaneously displayed on a single display screen. In FIG. 8, video signals from video signal generating means 1 and 2, which may be video disc players, and video signals externally connected to video signal input terminals 3 and 4 are coupled to a main picture scene change-over switch 5 and an auxiliary picture scene change-over switch 6. The respective outputs of switching control signal generating circuits 7 and 8 are coupled to the respective control input terminals of the main picture scene change-over switch 5 and the auxiliary picture scene change-over switch 6. Switching control signal generating circuits 7 and 8 comprise encoders that convert signals responsive to operation of key switch groups 9 and 10 into coded 2-bit binary switching control signals. Each picture scene change over switch 5 and 6 may select one of four video signals from video signal generating means 1 and 2 and external picture input terminals 3 and 4, in response to the switching control signal.

The output of main picture scene change-over switch 5 is coupled to change-over switch 11 and control circuit 12. The output of auxiliary picture scene change-over switch 6 is coupled to analog-to-digital (A/D) converter 13 and control circuit 12. In control circuit 12, the output of main picture scene change-over switch 5 is coupled to synchronizing separation circuit 21, where vertical and horizontal synchronizing signals are separated. The vertical and horizontal synchronizing signals separated by synchronizing separation circuit 21 are fed to memory controller 22 and read clock pulse generating circuit 23. Output from auxiliary picture scene change over switch 6 is coupled to synchronizing separation circuit 24 for separation of vertical and horizontal synchronizing signals. The horizontal and vertical synchronizing signals separated by synchronizing separation circuit 24 are coupled to memory controller 22 and write clock pulse generating circuit 25.

Read and write clock pulse circuits 23 and 25 generate predetermined read and write clock pulses in synchronism with the horizontal and vertical synchronizing signal from synchronizing separation circuits 21 and 24, respectively. Memory controller 22 is coupled to memory 14, whereby memory controller 22 sequentially writes the output data of A/D converter 13 into memory 14 in response to the write clock pulse, detects a scene portion corresponding to a predetermined reduced picture scene within a two-dimensional main picture scene formed by a video signal output from main picture scene change-over switch 5 in response to the vertical and horizontal synchronizing signals output from synchronizing separation circuit 21, and performs control operations to read the stored data of memory 14 in response to the read clock pulse for a period corresponding to the detected scene portion.

The write clock pulse is coupled to A/D converter 13 as a sampling pulse. A/D converter 13 samples the video signals output from auxiliary picture scene change-over switch 6 on the basis of this sampling pulse and produces a digital signal corresponding to an obtained sample value. The output data of A/D converter 13 is directed to memory 14. Memory 14 is controlled by memory controller 22 whereby output data of A/D converter 13 is sequentially written into memory 14 and the written data is sequentially read from memory 14 at the same time. The data read from memory 14 is coupled to digital-to-analog (D/A) converter 15 and is converted into a video signal representing a reduced picture.

The video signal output from D/A converter 15 is coupled to change-over switch 11. A switching command signal from memory controller 22 is coupled to a control input terminal of change-over switch 11 over a read period. Change-over switch 11 selects video signal output from main picture scene change-over switch 5 when the switching command signal is absent, and selects the video signal output from D/A converter 15 when the switching command signal is present. The selected signal is coupled to picture output terminal 26. A picture a formed by the video signal transferred from main picture scene change-over switch 5 and a reduced picture b formed by the video signal selected by auxiliary picture scene change-over switch 6 are combined by change-over switch 11 and are displayed as a single picture scene, as shown in FIG. 9.

In the aforementioned configuration, only two pictures can be displayed in a single picture scene at the same time, that is, one as a main picture scene and the other as a single auxiliary picture scene. Accordingly, in the case where a desired one of a plurality of pictures, from a plurality of input video signals, is to be displayed in the main picture scene, it is necessary to search for the desired picture by repeated manual operation of key switch groups 9 and 10 and to sequentially observe the selected pictures. This is a cumbersome and inefficient process.

It is, therefore, an object of the present invention to provide a video signal processing device in which pictures formed by a plurality of video signals can be efficiently displayed in a single scene at the same time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a device and corresponding method for processing video signals are provided comprising a first signal selecting means for selecting one of N input video signals (N being an integer greater than 1) as a main picture scene signal; a first conversion means for converting each of the N input video signals into a picture scene data group; a storage means for storing the N picture scene data groups; a second conversion means for converting the stored N picture scene data groups into N reduced picture scene data groups; and a combining means for generating an auxiliary picture signal from the N reduced picture scene data groups and for combining the main picture scene signal with the auxiliary picture signal to create a second main picture scene signal representing a main picture scene having N reduced picture scenes.

It is preferable to provide a video signal recorded on a recording medium as one of the N input video signals and to provide a third signal selecting means for selecting one of N−1 input video signals other than the recorded video signal, and recording the output of the third signal selecting means on the recording device.

It is also preferable to select one of the N input video signals using a manual switch, where the arrangement of switch operating keys corresponds to a predetermined arrangement of displayed auxiliary picture scenes.

It is also preferable to display an icon or reference sign, with each of the auxiliary picture scenes, which corresponds to the manual switch that selects the display of the corresponding video signal.

The accompanying drawings, which are incorporated in and constitute a part of the specification, illustrate a preferred embodiment of the invention, and together with the general description given above and the detailed description of the preferred embodiments given below, serve to explain the principles of the invention.

DESCRIPTION OF THE PREFERRED EMBODIMENT

Figure 1:
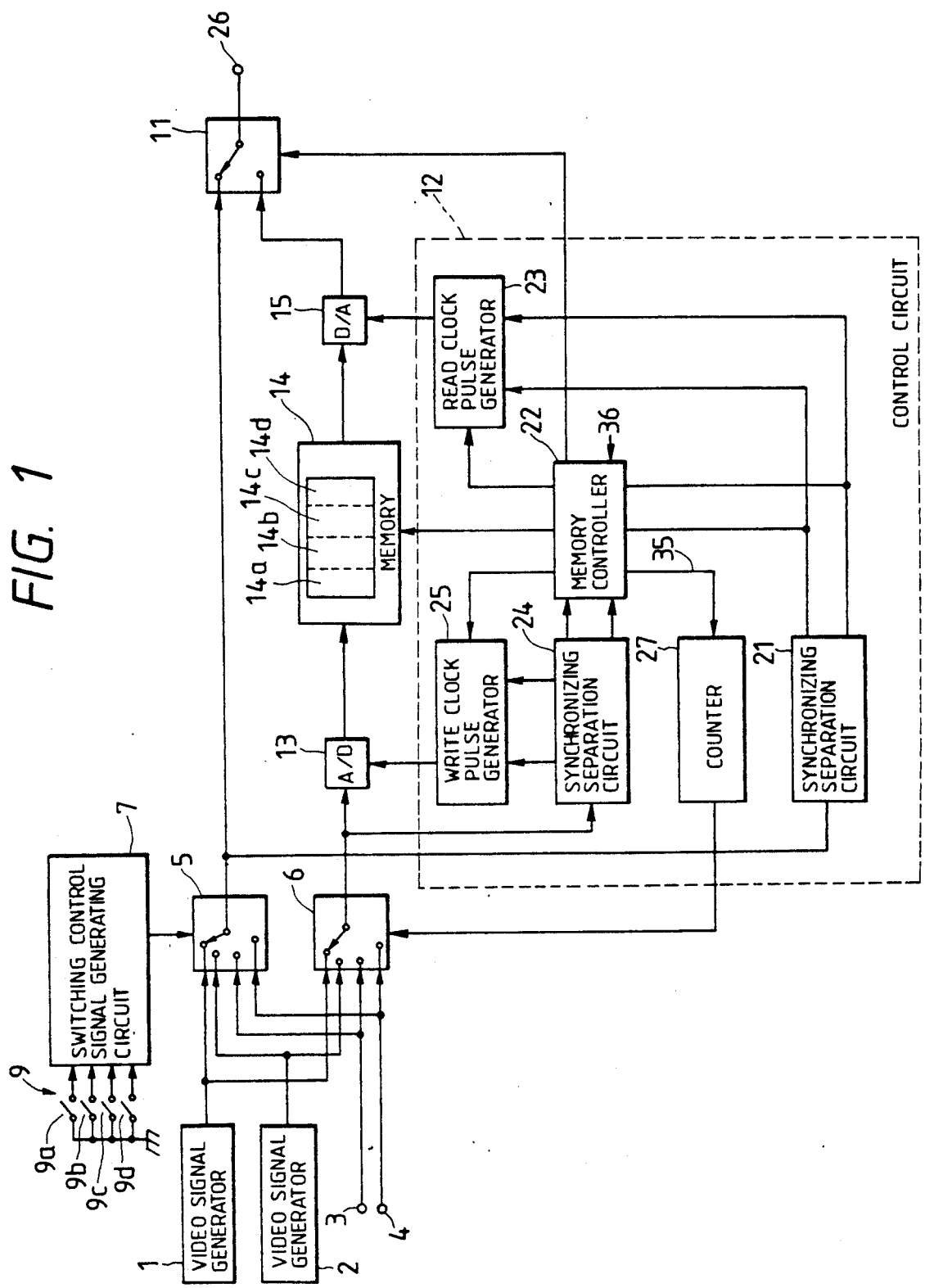
FIG. 1 is a block diagram illustrating a first preferred embodiment of a device for processing video signals incorporating the teachings of the present invention.

Reference will now be made in detail to the present preferred embodiment of the invention as illustrated in the accompanying drawings, in which like components are identified by the same reference numeral.

Figure 8:
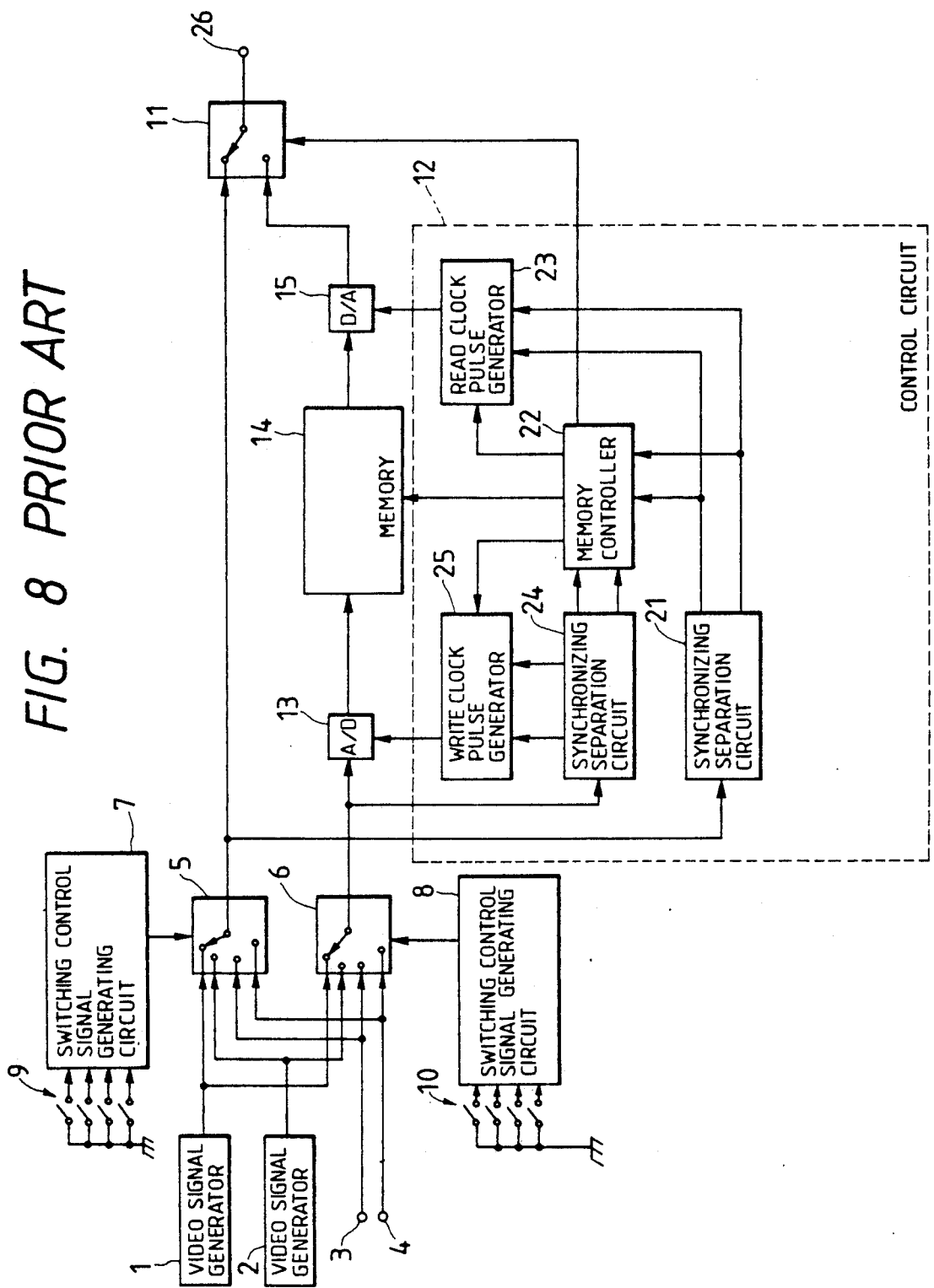
FIG. 8 is a block diagram illustrating a conventional video signal processing device.

As shown by FIG. 1, a first preferred embodiment of a device for processing video signals incorporating the teachings of the present invention comprises video signal generating means 1 and 2, picture input terminals 3 and 4, main picture scene change-over switch 5, auxiliary picture scene change-over switch 6, switching control signal generating circuit 7, key switch group 9, change-over switch 11, control circuit 12, A/D converter 13, memory 14 and D/A converter 15, which are connected in a manner similar to those of the device of FIG. 8.

In control circuit 12 of the first preferred embodiment, a control signal 35 from memory controller 22 is coupled to counter 27. Counter 27, in the first preferred embodiment, is a 2-bit binary counter. Output data of counter 27 is used as a switching control signal for auxiliary picture scene change-over switch 6. Switching of auxiliary picture scene change-over switch 6 is performed whenever a picture scene of data is stored in memory 14. Auxiliary picture scene change-over switch 6 outputs sequentially, field by field, video signals input from video signal generating means 1 and 2 and the video signals externally input through picture input terminals 3 and 4.

Write clock pulse generating circuit 25 in control circuit 12 of the first preferred embodiment generates a predetermined sampling pulse in synchronism with horizontal and vertical synchronizing signals and provides the sampling pulse to A/D converter 13. A/D converter 13 samples video signals for one horizontal scanning period every four horizontal scanning periods. In the first preferred embodiment, the sampling frequency is set to a quarter of the frequency of a read clock signal output from read clock pulse generating circuit 23, although other sampling rates could be used, as will be discussed further below.

The respective video signals sequentially outputted from auxiliary picture scene change-over switch 6 are fed to A/D converter 13 to be converted into picture scene data represented by conventional picture element (pixel) data. Pixels are displayed at respective coordinates set on a two-dimensional picture scene, in accordance with the sampling pulse output from write clock pulse generating circuit 25.

Picture scene data groups outputted from A/D converter 13 are coupled to memory 14 which, in the first preferred embodiment, is divided into four areas 14a to 14d. The invention is not limited to four memory areas, however, the sampling frequency must correspond to the selected number of memory areas. Four picture scene data groups obtained by converting four video signals sequentially transferred from auxiliary picture scene change-over switch 6 are stored in memory areas 14a to 14d, respectively, as will be described below. In the first preferred embodiment, memory controller 22 comprises a conventional microcomputer having a processor, a ROM, a RAM, etc., and a gate array. Memory 14 and clocks 23 and 25 are controlled by memory controller 22, which operates according to a program stored in the ROM. An auxiliary picture scene display command 36, produced in an operation section (not shown) in response to keyboard input by an operator, is applied to memory controller 22.

Memory controller 22 supplies a control signal 35 to counter 27 which causes auxiliary picture scene change-over switch 6 to select one of four video signals. Next, memory controller 22 causes memory 14 to write one group of picture scene data into a predetermined area within memory 14 at the timing of horizontal and vertical synchronizing signals fed from synchronizing separation circuit 24. After writing the picture scene of data, memory controller 22 sends another control signal 35 to counter 27 to select another of the four video input signals.

By repeating the above operation, four groups of picture scene data obtained through conversion of four video signals outputted from auxiliary picture scene change over switch 6 are respectively written into the four areas 14a to 14d in memory 14. Data stored in memory areas 14a to 14d is now read from those areas, starting with a predetermined scan line, in synchronism with a video signal inputted from main picture scene change-over switch 5. Reading is controlled to align the pictures formed by the respective data stored in areas 14a to 14d in the horizontal direction. Since the frequency of the read clock pulse supplied to D/A converter 15 is four times as high as the frequency of the write clock pulse at that time, the pictures formed by the respective data stored in areas 14a to 14d are reduced to one quarter in the horizontal direction.

Figure 2:
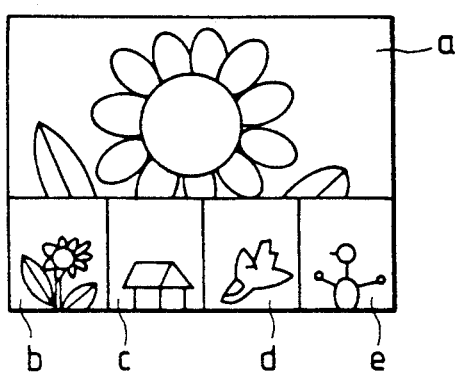
FIG. 2 is a diagram illustrating a picture scene output by the device of FIG. 1.

As shown in FIG. 2, one picture a formed by the video signal output from main picture scene change-over switch 5 and four pictures b to e obtained by reducing the four video signals sequentially selected by auxiliary picture scene change over switch 6 into one quarter in the vertical and horizontal directions respectively, are combined and displayed in a single picture scene. Accordingly, it is possible for an observer to determine by a quick glance at the picture scene, whether a picture formed by a desired one of the input video signals is selected. It is not necessary to repeat manual picture selection operations, thereby speeding picture signal identification. Further, it is possible to continuously monitor the status of video signal generating devices without manually selecting the device output signals.

Figure 3:
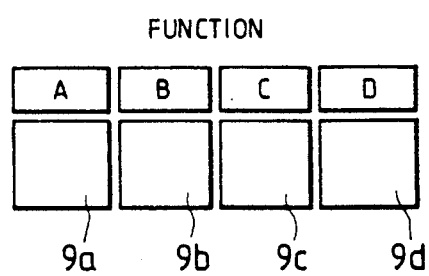
FIG. 3 is a diagram illustrating an array of operating keys of a key switch group of the device of FIG. 1.

To facilitate the selection of a main picture scene signal from the N auxiliary picture scene signals, operating keys 9a–9d of key switch group 9 may be aligned to correspond to the sequence of auxiliary picture scenes, as shown in FIG. 3.

Since an A/D converter, a D/A converter, a control circuit, etc., are shared by the respective input video signals, it is also possible to obtain the object of the invention without increasing the number of circuit components and correspondingly increase the cost of the device.

Figure 4:
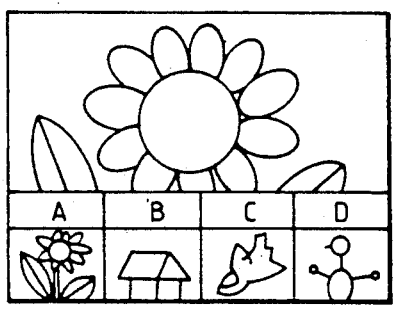
FIG. 4 is a diagram illustrating another example of a picture scene produced by the device of FIG. 1.
Figure 9:
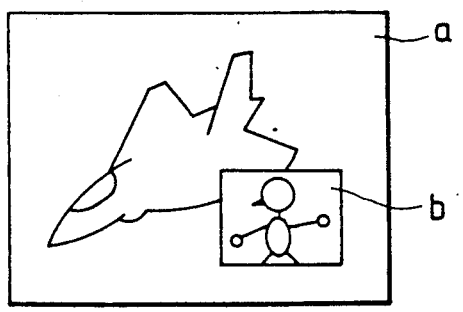
FIG. 9 is a diagram illustrating a picture obtained by the device of FIG. 8.

Furthermore, a character generator for generating pattern data of signs, or icons, representing the respective operation keys may be provided. The output of this character generator may be combined with the output of D/A converter 15 to modify the picture scene such that the icon, e.g. A, B, C, etc., for an operation key is displayed in a corresponding auxiliary picture scene, as shown in FIG. 4.

Figure 5:
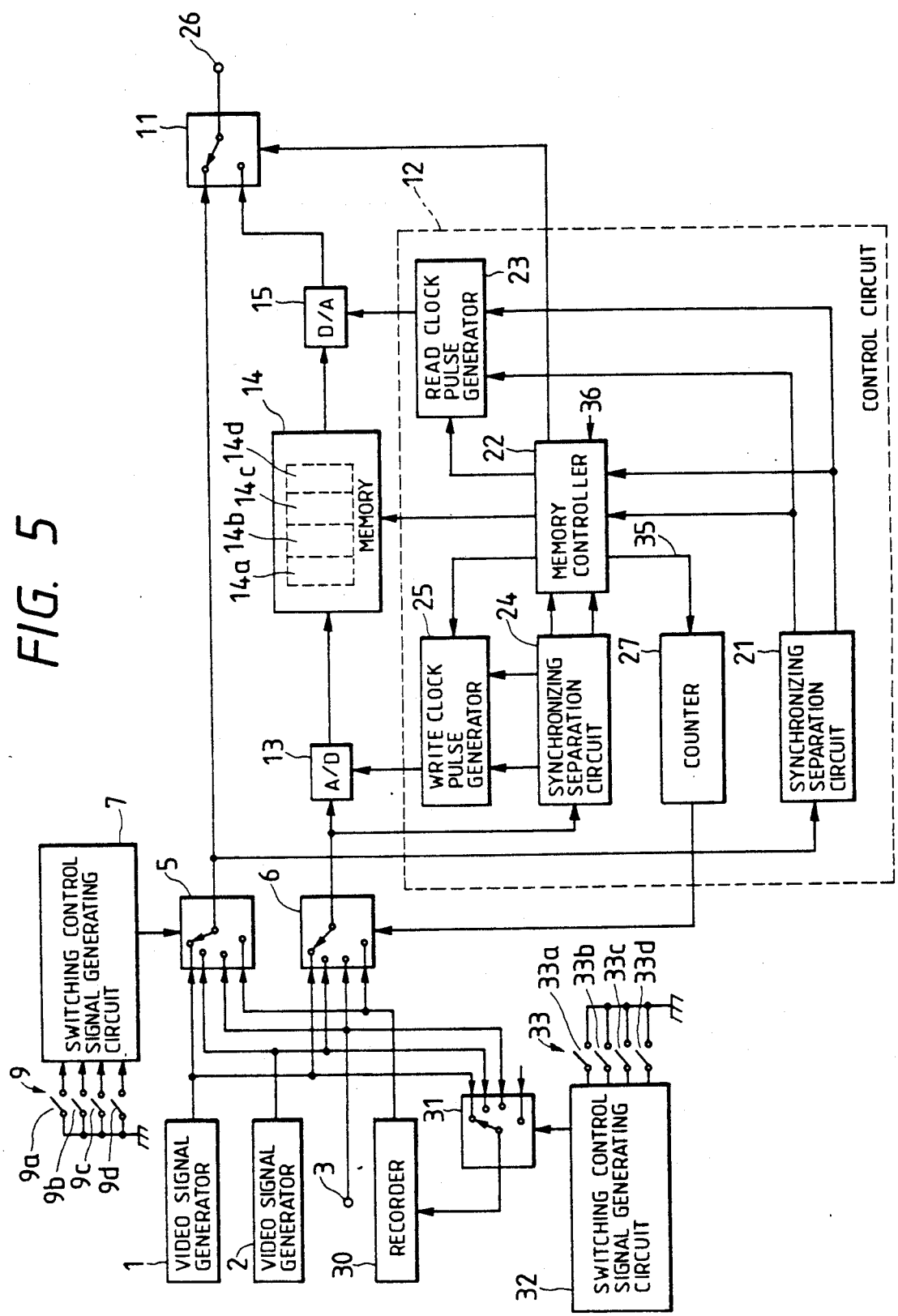
FIG. 5 is a block diagram illustrating a second preferred embodiment of a device for processing video signals incorporating the teachings of the present invention.

As shown in FIG. 5, by way of example and not as a limitation, a second preferred embodiment of the video signal processor of the present invention comprises video signal generating means 1 and 2, a picture input terminal 3, a main picture scene change-over switch 5, an auxiliary picture scene change-over switch 6, a switching control signal generating circuit 7, a key switch group 9, a change-over switch 11, a control circuit 12, an A/D converter 13, a memory 14 and a D/A converter 15. The components of the second preferred embodiment are connected in a manner similar to those of the device shown in FIG. 8, however, in the second preferred embodiment a video output signal from a video signal recording/reproducing apparatus 30 such as a video tape recorder (VTR) or similar device is coupled to main picture scene change-over switch 5 and auxiliary picture scene change-over switch 6 together with video signals output from video signal generating means 1 and 2 and a video signal input by picture input terminal 3. The video signals outputted from video signal generating means 1 and 2 and video input terminal 3 are also coupled to a recording signal change-over switch 31.

Figure 6:
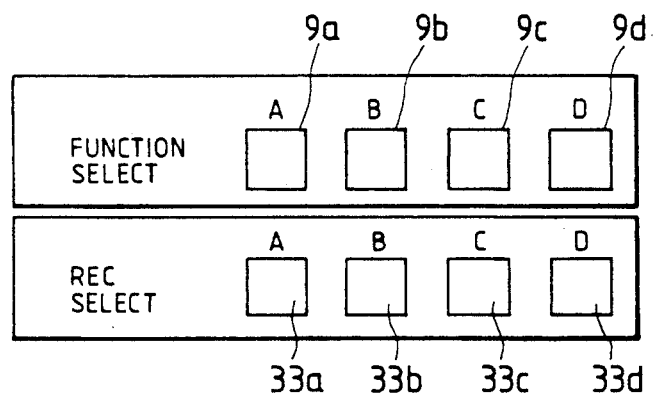
FIG. 6 is a diagram illustrating arrays of key switch groups in the device of FIG. 5.

The output of switching control signal generating circuit 32 is coupled to a control input terminal of recording signal change-over switch 31. Switching control signal generating circuit 32, in the second preferred embodiment, is similar to switching control signal generating circuit 7, and comprises an encoder that converts respective signals produced in response to keying operations of key switch group 33 into coded 2-bit binary data signals and outputs the coded signals as a switching control signal to recording signal change-over switch 31. Recording signal change-over switch 31 responds to the switching control signal to selectively output one of three video signals (the fourth input to switch 31 is not connected) from video signal generating means 1 and 2 and external input terminal 3. The video signal outputted from recording signal change-over switch 31 is coupled to video signal recording/reproducing apparatus 30 as a signal to be recorded. FIG. 6 shows arrays of operating keys 9a–9d and 33a–33d of key switch groups 9 and 33. Switch 33d is not used in the second preferred embodiment.

In the above-mentioned configuration, in the same manner as the device of FIG. 1, it is possible to display four pictures formed by four video signals in a single picture scene at the same time. Thus, it is possible to confirm proper recording of one of the video input signals by a quick glance at the auxiliary picture scenes, regardless of whether the video signal being recorded is a desired video signal. Moreover, since the array of switches in key switch group 33, for selecting a video signal to be recorded, corresponds to the arrangement of the auxiliary picture scenes as shown in FIG. 6, ease of operation is further enhanced.

Figure 7:
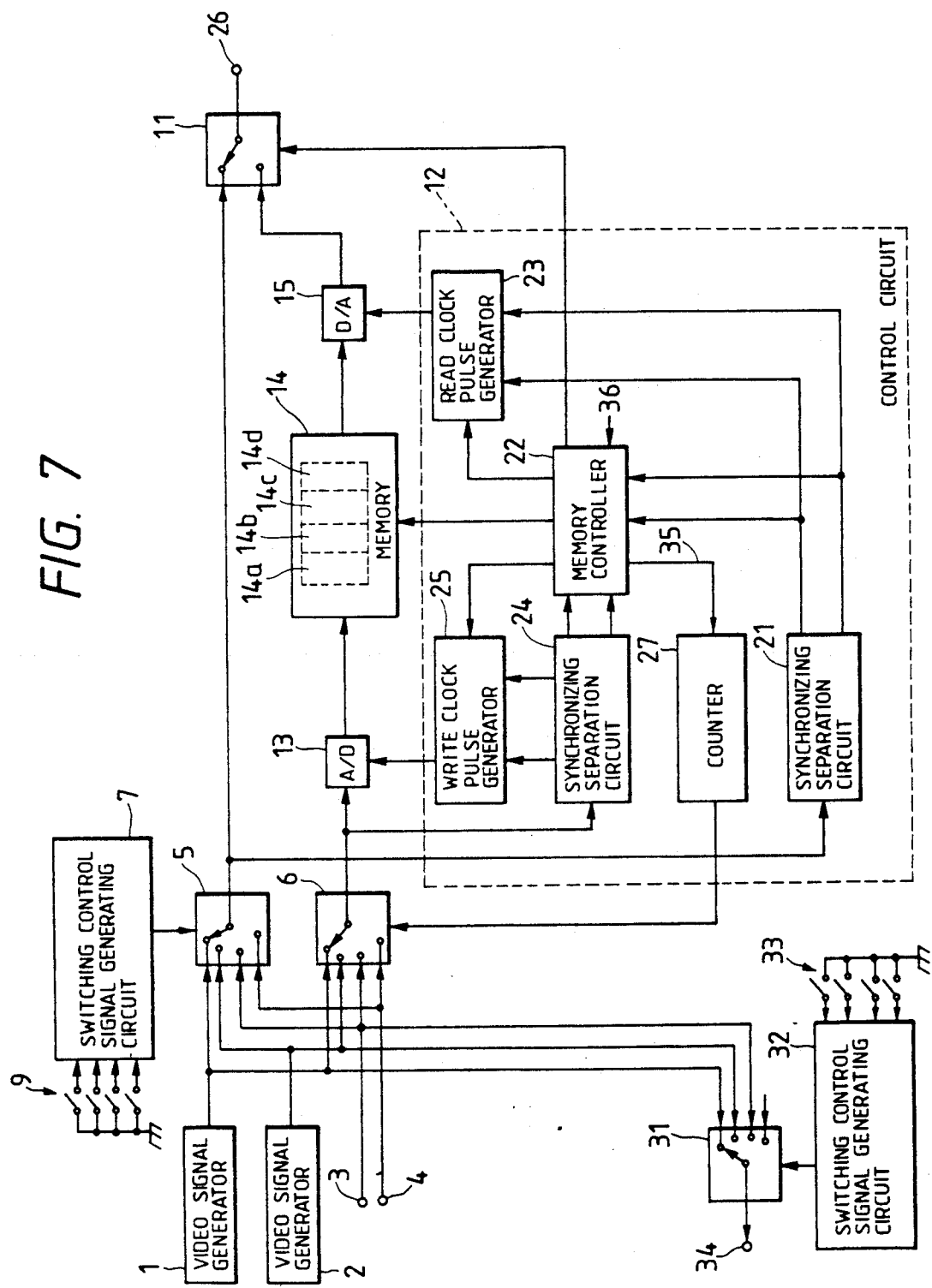
FIG. 7 is a block diagram illustrating a third preferred embodiment of a device for processing video signals incorporating the teachings of the present invention.

A third preferred embodiment of a video signal processing device incorporating the teachings of the present invention is shown in FIG. 7 by way of example and not as a limitation as comprising the same components as the second preferred embodiment of FIG. 5, except that the output of recording signal change-over switch 31 is coupled to recording signal output terminal 34, and a signal applied to picture input terminal 4 is coupled to main picture scene change-over switch 5 and auxiliary picture scene change-over switch 6 in place of the output of video signal recording/reproducing apparatus 30 of FIG. 5. The device of the third preferred embodiment can perform the same operations as the device of the second preferred embodiment.

In the first, second, and third preferred embodiments, key switch groups 9 and 33 may be fabricated to be integral with the body of the video signal processing device, or may be fabricated as remote control units or similar devices.

The video signal processing device described above, is not limited to four inputs. In accordance with the invention, one of N input video signals is selected as a main picture scene signal in response to a command, each of the remaining N input video signals is converted into picture scene data groups, these picture scene data groups are stored in a storage means, the stored picture scene data groups are converted into reduced picture scene data for N auxiliary picture scenes on a main picture scene respectively assigned to the picture scene data groups, and the main picture scene signal is combined with the reduced picture scene data. A picture formed by the selected input video signal as a main video signal and pictures formed by the respective N input video signals are combined and displayed in a single picture scene at the same time. Consequently, it is possible to determine by a quick glance at the picture scene, whether a desired video signal is selected from the input video signals as a main video signal, thus eliminating the need to repeat a manual picture selection operation. This makes it convenient to continuously monitor the operating condition of video signal source devices without the need for manual switching operations.

When the respective N auxiliary picture scenes assigned for the picture scene data groups are arranged in a predetermined sequence in a predetermined area on the main picture scene, it is easy to verify a signal selected as a main video signal.

When signs, or icons, representing the respective N input video signals are displayed in their corresponding N auxiliary picture scenes, it is also easy to verify a signal selected as a main video signal.

When a command for selecting one of the N input video signals is produced by manual operation of a switch, and the arrangement of the keys of this switch coincides with the arrangement of auxiliary picture scenes on the main picture scene, the selection of a main video signal is rendered more simple and less prone to operator error.

When a video signal recorded on a recording medium is inputted to the video signal processing device as one of the N input video signals, and a third signal selecting means for selecting one of N−1 input video signals, excluding the recorded video signal, is provided to direct the output of the third signal selecting means to the recording device, it is possible to quickly confirm that the video signal being recorded is a desired video signal by glancing at the auxiliary picture scenes, thus reducing the chance of operator error.

Moreover, when the sequence of operating keys of the third signal selecting means coincides with that of the auxiliary picture scenes on the main picture scene, it is possible to select a recorded video signal with reduced possibility of human error.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of applicant's general inventive concept.

I claim:

1. A device for processing video signals representing picture scenes, comprising:
    a first signal selecting means for selecting one of N input video signals (N being an integer greater than 1) as a main picture scene signal;
    a first conversion means for converting said N input video signals into N picture scene data groups, respectively;
    a storage means for storing said N picture scene data groups;
    a second conversion means for converting said stored N picture scene data groups into N reduced picture scene data groups; and
    a combining means for generating an auxiliary picture signal from said N reduced picture scene data groups and for combining said main picture scene signal with said auxiliary picture signal to create a second main picture scene signal representing a main picture scene having each of N reduced picture scenes.

2. A device for processing video signals according to claim 1, wherein said N reduced picture scenes represented by said N input video signals are arranged in a predetermined order in a predetermined area on said main picture scene.

3. A device for processing video signals according to claim 2, wherein said first signal selecting means includes a manually operated switch for selecting one of N input video signals.

4. A device for processing video signals according to claim 3, wherein said manually operated switch includes at least N operating keys and wherein the order of arrangement of said operating keys coincides with said predetermined order.

5. A device for processing video signals according to claim 2, wherein one of said N input video signals is a video recorder signal played back from a recording medium wherein said video recorder tunes a television signal on the air and outputs said television signal as one of said N video signals, and wherein said device further comprises a third signal selecting means for selecting one of said N input video signals other than said video recorder signal, and wherein the output of said third signal selecting means is recorded on said recording medium.

6. A device for processing video signals according to claim 5, wherein said third signal selecting means includes a second manually operated switch for selecting one of said N input video signals other than said video recorder signal.

7. A device for processing video signals of claim 6, wherein said second manually operated switch includes at least N−1 operating keys and wherein the order of arrangement of said operating keys of said second switch coincides with said predetermined order.

8. A method for processing video signals representing picture scenes, comprising the steps of:
    selecting one of N input video signals (N being an integer greater than 1) as a main picture scene signal using a first signal selecting means;
    converting said N input video signals into N picture scene data groups, respectively using a first conversion means;
    storing said N picture scene data groups in a storage means;
    converting said stored N picture scene data groups into N reduced picture scene data groups using a second conversion means;
    generating an auxiliary picture signal from said N reduced picture scene data groups; and
    combining said main picture scene signal with said auxiliary picture signal to create a second main picture scene signal representing a main picture scene having each of N reduced picture scenes.

9. A method for processing video signals according to claim 8, wherein said step of combining includes a step of arranging said N reduced picture scenes represented by said N input video signals in a predetermined order in a predetermined area on said main picture scene.

10. A method for processing video signals according to claim 9, wherein said step of selecting includes manually selecting one of N input video signals using a manually operated switch.

11. A method for processing video signals according to claim 10, wherein said manually operated switch includes at least N operating keys and wherein the order of arrangement of said operating keys coincides with said predetermined order.

12. A method for processing video signals according to claim 9, wherein one of said N input video signals is a video recorder signal from a video recorder, wherein said video recorder tunes a television signal on the air and outputs said television signal as one of said N video signals, and, wherein said step of selecting includes selecting a video signal to be recorded on a recording medium, and wherein aid method further comprises a step of selecting one of said N video signals other than said video recorder signal using a third signal selecting means, and a step of recording the output of said third signal selecting means on said recording medium.

13. A method for processing video signals according to claim 12, wherein said step of selecting one of said N input video signals other than said video recorder signal includes manually selecting one of said signals using a second manually operated switch.

14. A method for processing video signals according to claim 13, wherein said second manually operated switch includes at least N−1 operating keys and wherein the order of arrangement of said operating keys of said second switch coincides with said predetermined order.

* * * * *

UNITED STATES PATENT AND TRADEMARK OFFICE
CERTIFICATE OF CORRECTION

PATENT NO.  : 5,040,067
DATED       : August 13, 1991
INVENTOR(S) : Seiichi Yamazaki It is certified that error appears in the above-identified patent and that said Letters Patent is hereby corrected as shown below:

Claim 12, column 9, line 17, change "aid" to --said--.

Signed and Sealed this

Thirtieth Day of March, 1993

Attest:

STEPHEN G. KUNIN

Attesting Officer

Acting Commissioner of Patents and Trademarks